3,226,221
INHIBITING TOBACCO SUCKER GROWTH

Howard A. Hageman, Southbury, and John A. Riddell, Hamden, Conn., assignors to United States Rubber Company, New York, N.Y., a corporation of New Jersey
No Drawing. Filed Jan. 28, 1963, Ser. No. 254,427
3 Claims. (Cl. 71—2.7)

This invention relates to plant growth regulants and herbicides.

We have found that alkylenedinitramines, alkali salts of alkylenedinitramines, N-methylol alkylenedinitramines, N,N'-dinitroalkyleneureas and N,N'-dicarbalkoxyalkylenedinitraimines are effective plant growth regulants and herbicides.

The alkylenedinitramines may be prepared by hydrolysis of the N,N'-dinitroalkyleneureas or hydrolysis of the N,N'-dicarbalkoxyalkylenedinitramines. The N-methylol alkylenedinitramines may be prepared by treating the alkylenedinitramines with formaldehyde. The alkali (i.e., alkali-metal, ammonium and amine) salts may be prepared by treating the alkylenedinitramines with alkali-metal (sodium or potassium) hydroxide, ammonia or amine. The alkylene radicals in the above compounds may have from 2 to 10 carbon atoms. The alkyl groups in the carbalkoxy radicals in the N,N'-dicarbalkoxyalkylenedinitramines may have from 1 to 10 carbon atoms. References: McKay and Wright, Jour. Am. Chem. Soc., 70, 3990–3994 (1948); McKay and Manchester, Jour. Am. Chem. Soc., 71, 1970–1973 (1949); Bachmann et al., Jour. Am. Chem. Soc., 72, 3132–3134 (1950).

Examples of the plant growth regulants and herbicides of the present invention are:

Ethylenedinitramine
1,2-propylenedinitramine
1,3-propylenedinitramine
1,4-butylenedinitramine
1,6-hexylenedinitramine
1,8-octylenedinitramine
1,10-decylenedinitramine
Ethylenedinitramine, ammonium salt
Ethylenedinitramine, sodium salt
Ethylenedinitramine, diethanolamine salt
Ethylenedinitramine, triethylamine salt
1,3-propylenedinitramine, sodium salt
N-methylol ethylenedinitramine
N-methylol 1,3-propylenedinitramine
N-methylol 1,4-butylenedinitramine
1,3-dinitroimidazolidone-2
1,3-dinitro-4-methylimidazolidone-2
1,3-dinitro-2-ketohexahydropyrimidine
N,N'-dicarbethoxyethylenedinitramine
   (or ethylene-bis-N-nitrourethane)
N,N'-dicarbobutoxyethylenedinitramine
N,N'-dicarbodecoxyethylenedinitramine The chemicals of the present invention may be applied to plants to alter the growth characteristics of the plant. They may be applied to the soil before emergence of weeds as pre-emergence herbicides. They may also be applied as post-emergence herbicides to weeds growing in soil. The chemicals may be applied as dusts when admixed with a powdered solid carrier, such as various mineral silicates, e.g., mica, talc, pyrophillite and clays. The chemicals may be mixed with surface-active dispersing agents, as herbicidal concentrates, to facilitate dispersing in water and to improve the wetting properties when used as sprays. If desired, the chemicals may be mixed with a powdered solid carrier together with a surface-active dispersing agent so that a wettable powder may be obtained which may be applied directly, or which may be shaken up with water to make an aqueous dispersion for application in that form. The chemicals may be dissolved in a solvent such as acetone or benzene or an oil such as a hydrocarbon or chlorinated hydrocarbon oil, and the solution of the chemical dispersed in water with the aid of a surface-active dispersing agent to give a sprayable aqueous dispersion. Such surface-active dispersing agents may be anionic or non-ionic or cationic surface-active agents. Such surface-active agents are well known and reference is made to Hoffman et al. U.S. Patent No. 2,614,916, columns 2 to 4, for detailed examples of the same. The chemicals of the present invention may be applied by the aerosol method. Solutions for the aerosol treatment may be prepared by dissolving the chemical directly in the aerosol carrier which is a liquid under pressure but which is a gas at ordinary temperature (e.g., 20° C.) and atmospheric pressure, or the aerosol solution may be prepared by first dissolving the chemical in a less volatile solvent and then admixing such solution with the highly volatile liquid aerosol carrier.

The effectiveness of the chemicals of the present invention as plant growth regulants and herbicides is illustrated in the following examples. All parts referred to herein are by weight.

Example 1

Aqueous solutions or suspensions of the chemicals were prepared by dissolving 500 mg. in 100 ml. of warm water containing 10 mg. of a non-ionic surface-active agent which is inactive in the test (isooctylphenyl polyethoxyethanol) to give a concentration of 5000 parts per million (p.p.m.) of the chemical to be tested. These solutions and suspensions of the chemical were sprayed to run-off on duplicate plants of greenhouse tobacco (var. Xantinc). The tops of the treated plants and of untreated control plants, including any developing leaves less than four inches long, were then mechanically removed. The plants were then placed in growth chambers maintained at 75° F. and 90–100% relative humidity. After 24 hours the plants were removed from the growth chambers and returned to the greenhouse. Three weeks after treatment, observations on the inhibition of sucker re-growth were recorded. The data were scored by measuring the length of the suckers on treated plants and comparing the extent of sucker growth with untreated control plants.

The formula to determine percent inhibition of sucker growth is:

Percent inhibition = 100 −

$$\left(\frac{\text{Ave. sucker length on treated plants}}{\text{Ave. sucker length on control plants}} \times 100\right)$$

The results of the tests are shown in the following table:

| Chemical: | Percent inhibition |
|---|---|
| Ethylenedinitramine | 95 |
| 1,3-dinitroimidazolidone-2 | 58 |
| 1,3-propylenedinitramine | 95 |
| 1,4-butylenedinitramine | 95 |
| 1,6-hexylenedinitramine | 72 |
| Ethylenedinitramine, ammonium salt | 83 |
| 1,3-dinitro-2-ketohexahydropyrimidine | 83 |

Similarly, N-methylol ethylenedinitramine at a concentration of 10,000 p.p.m. gave 95% inhibition of sucker growth.

The above table shows that the chemicals of the present invention are effective to alter the growth characteristics of plants by suppression of the growing point of plants.

Example 2

This example illustrates the pre-emergence herbicidal effectiveness of the chemicals of the present invention.

Aqueous suspensions of 500 p.p.m. of various chemicals of the present invention were prepared by dissolving 0.1 gram of the chemical in 10 ml. of acetone, mixing therewith one drop (about 0.07 ml.) of a non-herbicidal non-ionic surface-active agent (isooctylphenyl polyethoxyethanol), and adding the mixture to 190 ml. of water. Six inch plastic test pots were prepared by filling to within an inch from the top with 1:1 sand-soil mixture. A 0.5 gram weight of weed seeds were spread evenly over the soil surface in each pot, and this was then covered with 1/8" thickness of the sand-soil mixture. The weed seeds included three grassy weeds, viz. crabgrass (*Digitaria ischaemum*), barnyard grass (*Echinochloa crusgalli*), and foxtail (*Setaria glauca*), and five broadleaf weeds, viz. pigweed (*Amanthus retroflexus*), purslane (*Portulaca oleracea*), quickweed (*Galinsoga ciliata*), ragweed (*Ambrosia artemisiifolia*), and lamb's-quarters (*Chenopodium album*). Eighty ml. of the aqueous suspensions of the chemicals were watered on the surface of the various test pots prepared as above. This gave an application rate of the chemicals of about 20 pounds per acre. Checks were run with water and with water containing the same amount of acetone and surface-active agent as in the above preparations. The pots were placed in the greenhouse and watered daily from the bottom or as often as required to keep the soil surface moist.

Three weeks after planting, the treatments were evaluated for percent weed control of both the grassy and broadleaf weeds, on the basis of 0% control for the checks (the weed growth was the same for the water and the water containing the acetone and surface-active agent) and 100% control for complete absence of weeds.

The following table shows the weed control of the grassy weeds and the broadleaf weeds by the chemicals of the present invention.

| Chemical | Percent Weed Control | |
|---|---|---|
| | Grassy | Broadleaf |
| Ethylenedinitramine | 99 | 99 |
| 1,3-Dinitroimidazolidone-2 | 70 | 85 |
| N,N'-dicarbethoxyethylenedinitramine | 99 | 0 |
| 1,6-Hexylenedinitramine | 10 | 90 |

Example 3

This example illustrates the post-emergence herbicidal effectiveness of the chemicals of the present invention.

Aqueous suspensions of 2000 p.pm. of various chemicals of the present invention were prepared by dissolving 0.5 gram of the chemical in 20 ml. of acetone, mixing therewith three drops (about 2 ml.) of a non-heribicidal, non-ionic, surface-active agent (isooctylphenyl polyethoxyethanol), and adding the mixture to 230 ml. of water.

Boxes 4" x 4" x 4" were filled to within one-half inch of the top with a 1:1 sand-soil mixture. A 0.5 gram weight of weed seeds was spread evenly over the soil surface in each box and this was covered with 1/8" thickness of the sand-soil mixture. The weed seeds were the same as described for the pre-emergence herbicide Example 2 above. The germinating seeds were maintained under a 16-hour-day length and a temperature of 75° F. for from 10 to 14 days. At time of chemical treatment, the broadleaf species were 1½" tall and the grassy species had leaves 4" to 5" long.

Duplicate boxes of the emerged weeds were sprayed to runoff with the 2000 p.p.m. aqueous suspensions. This gave an application rate of the chemicals of 4 lbs. per acre. Checks were run with water and with water containing the same amount of acetone and surface-active agent as in the above preparations. The boxes were returned to the greenhouse and watered daily from the bottom or as often as required to keep the soil surface moist. Ten days after chemical treatment, the chemicals were evaluated for percent weed control of both the grassy and broadleaf weeds, on the basis of 0% control for the checks (the weed growth was the same for the water and the water containing the acetone and surface-active agent) and 100% control for complete absence of weeds.

The following table shows the weed control of the grassy weeds and the broadleaf weeds by the chemicals of the present invention.

| Chemical | Percent Weed Control | |
|---|---|---|
| | Grassy | Broadleaf |
| 1,2-Propylenedinitramine | 75 | 93 |
| 1,3-Dinitro-4-methylimidazolidone-2 | 50 | 95 |

Having thus described our invention, what we claim and desire to protect by Letters Patent is:

1. The method of inhibiting sucker growth on tobacco plants which comprises treating tobacco plants with an amount effective to inhibit the growth of suckers on said plants of material selected from the group consisting of alkylenedinitramines in which the alkylene has 2 to 10 carbon atoms, alkali salts of alkylenedinitramines in which the alkylene has 2 to 10 carbon atoms, N-methylol alkylenedinitramines in which the alkylene has 2 to 10 carbon atoms, N,N'-dinitroalkyleneureas in which the alkylene has 2 to 10 carbon atoms, and N,N'-dicarbalkoxyalkylenedinitramines in which the alkyl groups in the dicarbalkoxy have 1 to 10 carbon atoms and the alkylene has 2 to 10 carbon atoms.

2. The method of inhibiting sucker growth on tobacco plants which comprises treating said plants with an amount of alkylenedinitramine in which the alkylene has 2 to 10 carbon atoms which is effective to inhibit the growth of suckers on said plants.

3. The method of inhibiting sucker growth on tobacco plants which comprises treating said plants with an amount of ethylenedinitramine which is effective to inhibit the growth of suckers on said plants.

References Cited by the Examiner

FOREIGN PATENTS 608,874 4/1962 Belgian.
918,882 2/1963 Great Britain.
935,671 9/1963 Great Britain.

OTHER REFERENCES

Bachman et al., Jour. Am. Chem. Soc., 72, 3132–3134 (1950).

LEWIS GOTTS, *Primary Examiner.*